(12) United States Patent
Zeng et al.

(10) Patent No.: US 11,716,106 B1
(45) Date of Patent: Aug. 1, 2023

(54) MULTIPATH SUPPRESSION METHOD BASED ON STEEPEST DESCENT METHOD

(71) Applicant: NANJING UNIVERSITY OF AERONAUTICS AND ASTRONAUTICS, Nanjing (CN)

(72) Inventors: Qinghua Zeng, Nanjing (CN); Wenqi Qiu, Nanjing (CN); Jianye Liu, Nanjing (CN); Rui Xu, Nanjing (CN); Yongrong Sun, Nanjing (CN); Rongbing Li, Nanjing (CN); Pin Lyu, Nanjing (CN); Wei Zhao, Nanjing (CN); Zhi Xiong, Nanjing (CN); Jizhou Lai, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/041,711

(22) PCT Filed: Jul. 9, 2021

(86) PCT No.: PCT/CN2021/105414
§ 371 (c)(1),
(2) Date: Feb. 15, 2023

(87) PCT Pub. No.: WO2022/037309
PCT Pub. Date: Feb. 24, 2022

(30) Foreign Application Priority Data

Aug. 18, 2020 (CN) .......................... 202010830476.3

(51) Int. Cl.
*H04B 1/18* (2006.01)
*H04B 1/10* (2006.01)
(Continued)

(52) U.S. Cl.
CPC ............ *H04B 1/1081* (2013.01); *G01S 19/22* (2013.01); *G01S 19/256* (2013.01); *G01S 19/30* (2013.01)

(58) Field of Classification Search
CPC .......... H04B 1/1081; H04B 1/16; H04B 1/18; H04B 2201/69; H04B 2201/70716;
(Continued)

(56) References Cited

U.S. PATENT DOCUMENTS 8,334,804 B2 * 12/2012 Miller .................... H04B 1/709
342/357.25
10,228,468 B1 3/2019 Wang et al.
(Continued)

FOREIGN PATENT DOCUMENTS

CN 101903794 A 12/2010
CN 101952736 A 1/2011
(Continued)

OTHER PUBLICATIONS

International Search Report issued in International Application No. PCT/CN2021/105414; dated Sep. 23, 2021; 3 pgs.
(Continued)

*Primary Examiner* — Tuan Pham
(74) *Attorney, Agent, or Firm* — Hauptman Ham, LLP

(57) ABSTRACT

A multipath suppression method based on a steepest descent method includes stripping, according to carrier Doppler shift information fed back by a phase-locked loop, a carrier from an intermediate-frequency signal input into a tracking loop; constructing, on the basis of the autocorrelation characteristics of a ranging code, a quadratic cost function related to a measurement deviation of the ranging code, the cost function being not affected by a multipath signal; and finally, designing a new tracking loop of the ranging code according to the quadratic cost function and the principle of the
(Continued)

steepest descent method, such that the loop has a multipath suppression function without increasing the computational burden. Compared with a narrow-distance correlation method, the current method reduces computing resources by ⅓, the design and adjustment of parameters are simple and feasible, a multipath suppression effect is superior, and a high engineering application value is obtained.

5 Claims, 1 Drawing Sheet

(51) Int. Cl.
*G01S 19/30* (2010.01)
*G01S 19/25* (2010.01)
*G01S 19/22* (2010.01)

(58) Field of Classification Search
CPC .............. H04B 2201/7163; G01S 19/22; G01S 19/256; G01S 19/30
See application file for complete search history.

(56) References Cited

U.S. PATENT DOCUMENTS 10,705,223 B2 * 7/2020 Manohar ................. G01S 19/24
10,830,903 B2 * 11/2020 Naveen ................... G01S 19/24

FOREIGN PATENT DOCUMENTS

| CN | 105204036 A | 12/2015 |
| CN | 106443726 A | 2/2017 |
| CN | 106461754 A | 2/2017 |
| CN | 109597101 A | 4/2019 |
| CN | 111880200 A | 11/2020 |

OTHER PUBLICATIONS

Written Opinion of the International Searching Authority issued in International Application No. PCT/CN2021/105414; dated Sep. 23, 2021; 10 pgs.

Liu, Lei; "Research on the Acquisition and Tracking Algorithm for Beidou Signal Based on FPGA"; Information Science & Technology, China Master's Theses Full-text Database, Nov. 30, 2014; 61 pgs. (English Abstract).

* cited by examiner

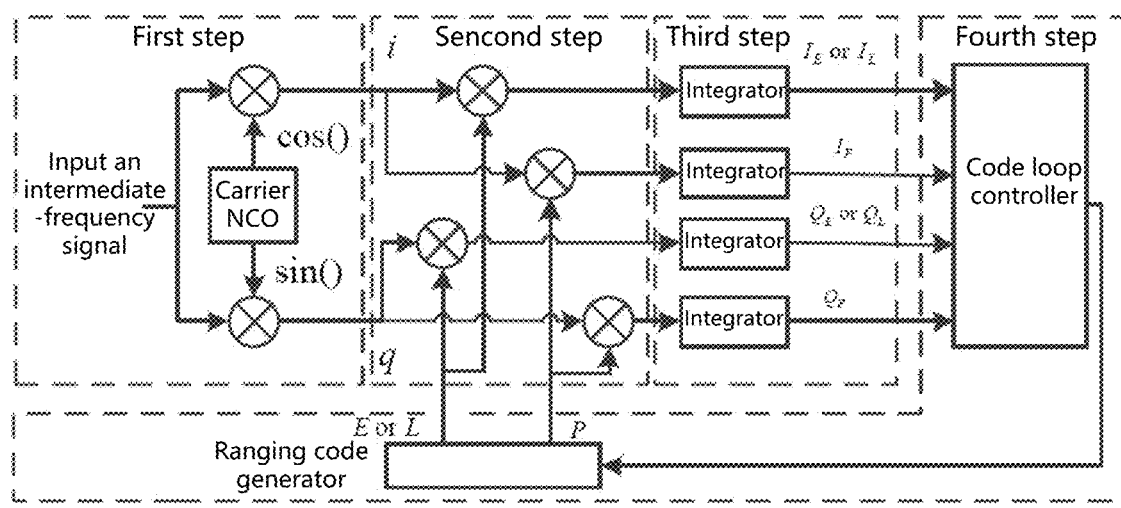

MULTIPATH SUPPRESSION METHOD BASED ON STEEPEST DESCENT METHOD

RELATED APPLICATIONS

The present application is a U.S. National Phase of International Application Number PCT/CN2021/105414, filed Jul. 9, 2021, and claims priority to Chinese Application Number 202010830476.3, filed Aug. 18, 2020.

TECHNICAL FIELD

The present disclosure relates to a multipath suppression method based on a steepest descent method, and belongs to the technical field of baseband signal processing.

BACKGROUND

Multipath suppression technology has wide applications in many fields, which get wider with the development of satellite navigation and positioning technology. In various important application scenarios such as in a city and on the sea surface, the accuracy of the satellite navigation and positioning technology is sharply decreased due to the limitation of the intensive multipath effect, while the multipath suppression technology can obviously improve the accuracy of the satellite navigation and positioning.

The current multipath suppression method can be roughly divided into four types. The first type is to keep away from signal reflection sources. These methods have been successfully applied to the site selection and design of an airport, which has a significant suppression effect on the multipath, but has a great limitation on the application scenarios of receiving machines. The second type is to choose a multipath suppression antenna, such as a choke ring antenna, a blocking plate, a right-handed polarized antenna, a composite antenna, and the like. These methods require an antenna with a complex design, and the antenna is expensive and has a large volume. The third type is Data post-processing, such as wavelet transform, carrier phase smoothing, Bayesian estimation, satellite selection. These methods have the problems of the scenario specificity or huge computation loads. The fourth type is to improve the structure of the tracking loop, such as, the Narrow-spacing correlation method, Multipath Estimation Delay Lock Loop (MEDLL) and Multipath Eliminating Technology (MET). These methods occupy a large amount of computation resources.

SUMMARY

Technical problems to be addressed in the present disclosure are to provide a multipath suppression method based on a steepest descent method, which is designed according to peak positions in the X-axis of a ranging code autocorrelation function does not move with the Non-Line-of-Sight (NLOS) interference, and is intended to improve a response speed of a loop, suppress the multipath effect and reduce computation loads.

In order to solve the above technical problems, the following technical solutions of the present disclosure are adopted.

Provided is a multipath suppression method based on a steepest descent method, including the following steps.

In Step 1, according to carrier Doppler shift information fed back by a phase-locked loop, a pair of orthogonal signals are generated by a local carrier Numerical Controlled Oscillator, and the pair of orthogonal signals are mixed with an intermediate-frequency signal x(n) input into a tracking loop of ranging codes respectively, to obtain a pair of orthogonal signals i(n) and q(n) after carrier extracting.

In Step 2, a quadratic cost function $PF(R)=(1-R)^2$ is designed, where R represents an autocorrelation function of the ranging codes. According to the quadratic cost function and a principle of the steepest descent method, when a right partial derivative of the cost function is adopted in the control process of a code loop controller, a local punctual code sequence C'(n) and a local early code sequence C'(n+d) are generated by a local ranging-code generator. The orthogonal signals i(n) and q(n) are taken respectively with the local punctual code sequence C'(n) for a correlating operation to obtain $i_P(n)$ and $q_P(n)$, and the orthogonal signals i(n) and q(n) are taken respectively with the local early code sequence C'(n+d) for a correlating operation to obtain $i_E(n)$ and $q_E(n)$.

Alternatively, when a left partial derivative of the cost function is adopted in the control process of the code loop controller, the local punctual-code sequence C'(n) and a local late code sequence C'(n-d) are generated by the local ranging-code generator. The orthogonal signals i(n) and q(n) are taken respectively with the local punctual-code sequence C'(n) for a correlating operation to obtain $i_P(n)$ and $q_P(n)$, and the orthogonal signals i(n) and q(n) are taken respectively with the late code sequence C'(n-d) for a correlating operation to obtain $i_L(n)$ and $q_L(n)$; where $i_P(n)$ is an I branch sequence correlated with a local punctual code, $q_P(n)$ is a Q branch sequence correlated with the local punctual code, $i_L(n)$ is an I branch sequence correlated with a local late code, $q_L(n)$ is a Q branch sequence correlated with the local late code, $i_E(n)$ is an I branch sequence correlated with the local early code, and $q_E(n)$ is a Q branch sequence correlated with the local early code.

In Step 3, the sequences $i_E(n)$, $i_P(n)$, $q_E(n)$ and $q_P(n)$ obtained in Step 2 are taken for a mean-value operation respectively to obtain corresponding $I_E$, $I_P$, $Q_E$ and $Q_P$, where $I_E$ is a mean value of the sequence $i_E(n)$; $I_P$ is a mean value of the sequence $i_P(n)$, $Q_E$ is a mean value of the sequence $q_E(n)$; and $Q_P$ is a mean value of the sequence $q_P(n)$.

Alternatively, the sequences $i_L(n)$, $i_P(n)$, $q_L(n)$ and $q_P(n)$ obtained in Step 2 are taken for a mean-value operation respectively to obtain corresponding $I_L$, $I_P$, $Q_L$ and $Q_P$, where $I_L$ is a mean value of the sequence $i_L(n)$; and $Q_L$ is a mean value of the sequence $q_L(n)$.

In Step 4, according to the $I_E$, $I_P$, $Q_E$ and $Q_P$ obtained in Step 3, a ranging-code offset is calculated by the code loop controller based on the steepest descent method, and the ranging code offset is fed back to the local ranging-code generator.

Alternatively, according to the $I_L$, $I_P$, $Q_L$ and $Q_P$ obtained in Step 3, a ranging code offset is calculated by the code loop controller based on the steepest descent method, and the ranging code offset is fed back to the local ranging-code generator.

As an optimal solution of the present disclosure, the pair of orthogonal signals are generated by the local carrier Numerical Controlled Oscillator, and the pair of orthogonal signals are mixed with the intermediate-frequency signal x(n) input into the tracking loop of the ranging codes respectively, to obtain the pair of orthogonal signals i(n) and q(n) after the carrier extracting, in which the equations are as follows:

$$i(n) = (x(n))(2\cos(w'_I n + \theta_1)) =$$
$$AC(n)D(n)\cos(\theta_0 - \theta_1) + AC(n)D(n)\cos(2w_I n + \theta_0 + \theta_1)$$
$$q(n) = (x(n))(2\sin(w'_I n + \theta_1)) =$$
$$-AC(n)D(n)\sin(\theta_0 - \theta_1) + AC(n)D(n)\sin(2w_I n + \theta_0 + \theta_1)$$

where A represents an amplitude of the intermediate-frequency signal x(n) input into the tracking loop, C(n) represents a ranging-code sequence modulated in the intermediate-frequency signal x(n) input into the tracking loop, D(n) represents a data-code sequence modulated in the intermediate-frequency signal x(n) input into the tracking loop, $w'_I$ is an angular velocity of a locally-generated signal, $w_I$ represents an intermediate-frequency angular velocity of the intermediate-frequency signal x(n) input into the tracking loop, where $w_I - w_I \approx 0$, $\theta_0$ represents an initial phase of a carrier of the intermediate-frequency signal x(n) input into the tracking loop, $\theta_1$ represents an initial phase of a locally-generated carrier signal, and n represents a time point, and an interval between the time point n and a time point n+1 is one sampling period.

As an optimal solution of the present disclosure, as described in Step 2, the orthogonal signals i(n) and q(n) are taken respectively with the local punctual-code sequence C'(n) for a correlating operation to obtain $i_P(n)$ and $q_P(n)$, and the orthogonal signals i(n) and q(n) are taken respectively with the local early code sequence C'(n+d) for a correlating operation to obtain $i_E(n)$ and $q_E(n)$, in which the equations are as follows:

$$i_E(n) = i(n)C'(n+d) =$$
$$AR(\hat{\tau}+d)D(n)\cos(\theta_0 - \theta_1) + AR(\hat{\tau}+d)D(n)\cos(2w_I n + \theta_0 + \theta_1)$$
$$i_P(n) = i(n)C'(n) =$$
$$AR(\hat{\tau})D(n)\cos(\theta_0 - \theta_1) + AR(\hat{\tau})D(n)\cos(2w_I n + \theta_0 + \theta_1)$$
$$q_E(n) = q(n)C'(n+d) =$$
$$-AR(\hat{\tau}+d)D(n)\sin(\theta_0 - \theta_1) + AR(\hat{\tau}+d)D(n)\sin(2w_I n + \theta_0 + \theta_1)$$
$$q_P(n) = q(n)C'(n) =$$
$$-AR(\hat{\tau})D(n)\sin(\theta_0 - \theta_1) + AR(\hat{\tau})D(n)\sin(2w_I n + \theta_0 + \theta_1)$$

The orthogonal signals i(n) and q(n) are taken respectively with the local punctual-code sequence C'(n) for a correlating operation to obtain $i_P(n)$ and $q_P(n)$, and the orthogonal signals i(n) and q(n) are taken respectively with the late code sequence C'(n-d) for a correlating operation to obtain $i_L(n)$ and $q_L(n)$, in which the equations are as follows:

$$i_L(n) = i(n)C'(n-d) =$$
$$AR(\hat{\tau}-d)D(n)\cos(\theta_0 - \theta_1) + AR(\hat{\tau}-d)D(n)\cos(2w_I n + \theta_0 + \theta_1)$$
$$i_P(n) = i(n)C'(n) =$$
$$AR(\hat{\tau})D(n)\cos(\theta_0 - \theta_1) + AR(\hat{\tau})D(n)\cos(2w_I n + \theta_0 + \theta_1)$$
$$q_L(n) = q(n)C'(n-d) =$$
$$-AR(\hat{\tau}-d)D(n)\sin(\theta_0 - \theta_1) + AR(\hat{\tau}-d)D(n)\sin(2w_I n + \theta_0 + \theta_1)$$
$$q_P(n) = q(n)C'(n) =$$
$$-AR(\hat{\tau})D(n)\sin(\theta_0 - \theta_1) + AR(\hat{\tau})D(n)\sin(2w_I n + \theta_0 + \theta_1)$$

where A represents an amplitude of the intermediate-frequency signal x(n) input into the tracking loop, D(n) represents a data-code sequence modulated in the intermediate-frequency signal x(n) input into the tracking loop, $w_I$ represents an intermediate-frequency angular velocity of the intermediate-frequency signal x(n) input into the tracking loop, $\theta_0$ represents an initial phase of a carrier of the intermediate-frequency signal x(n) input into the tracking loop; $\theta_1$ represents an initial phase of a locally-generated carrier signal; n represents a time point, R(·) represents an autocorrelation function of ranging codes, $\hat{\tau}$ represents a distance between the local punctual code and a signal ranging code, and d represents an interval of the ranging codes.

As an optimal solution of the present disclosure, the equations of the $I_E$, $I_P$, $Q_E$ and $Q_P$ as described in Step 3 are as follows:

$$I_E = \frac{1}{Tf_s}\sum_{n=1}^{Tf_s} i_E(n) \approx AR(\hat{\tau}+d)\cos(\theta_0 - \theta_1)$$

$$I_P = \frac{1}{Tf_s}\sum_{n=1}^{Tf_s} i_P(n) \approx AR(\hat{\tau})\cos(\theta_0 - \theta_1)$$

$$Q_E = \frac{1}{Tf_s}\sum_{n=1}^{Tf_s} q_E(n) \approx -AR(\hat{\tau}+d)\sin(\theta_0 - \theta_1)$$

$$Q_P = \frac{1}{Tf_s}\sum_{n=1}^{Tf_s} q_P(n) \approx -AR(\hat{\tau})\sin(\theta_0 - \theta_1)$$

the equations of the $I_L$, $I_P$, $Q_L$ and $Q_P$ are as follows:

$$I_L = \frac{1}{Tf_s}\sum_{n=1}^{Tf_s} i_L(n) \approx AR(\hat{\tau}-d)\cos(\theta_0 - \theta_1)$$

$$I_P = \frac{1}{Tf_s}\sum_{n=1}^{Tf_s} i_P(n) \approx AR(\hat{\tau})\cos(\theta_0 - \theta_1)$$

$$Q_L = \frac{1}{Tf_s}\sum_{n=1}^{Tf_s} q_L(n) \approx -AR(\hat{\tau}-d)\sin(\theta_0 - \theta_1)$$

$$Q_P = \frac{1}{Tf_s}\sum_{n=1}^{Tf_s} q_P(n) \approx -AR(\hat{\tau})\sin(\theta_0 - \theta_1)$$

where T represents an integration time, $f_s$ represents a sampling rate, n represents a time point, A represents an amplitude of the intermediate-frequency signal x(n) input into the tracking loop, R(·) represents an autocorrelation function of ranging codes, $\tau$ represents a distance between the local punctual code and a signal ranging code, d represents an interval of the ranging codes, $\theta_0$ represents an initial phase of a carrier of the intermediate-frequency signal x(n) input into the tracking loop; and $\theta_1$ represents an initial phase of a locally-generated carrier signal.

As an optimal solution of the present disclosure, the equation of the ranging code offset described in Step 4 is as follows:

$$\hat{\tau}_{k+1} = \hat{\tau}_k - \mu\frac{PF(\overline{S}_E|_k) - PF(\overline{S}_P|_k)}{d},$$

or the equation is as follows:

$$\hat{\tau}_{k+1} = \hat{\tau}_k - \mu\frac{PF(\overline{S}_P|_k) - PF(\overline{S}_L|_k)}{d},$$

where $\hat{\tau}_{k+1}$, and $\hat{\tau}_k$ respectively represent $\hat{\tau}$ at a time point k+1 and a time point k, $\hat{\tau}$ represents a distance between the local punctual code and a signal ranging code, an interval between the time point k+1 and the time point k is an integration time, μ is a positive scalar named step length, PF(·) represents a cost function, $\overline{S}_E|_k$ $\overline{S}_P|_k$ and $\overline{S}_L|_k$ respectively represent values of $\bar{S}_E$, $\bar{S}_P$, and $\bar{S}_L$ at the time point k, $\bar{S}_E$ represents a normalized value of $S_E$, $\bar{S}_P$ represents a normalized value of $S_P$, $\bar{S}_L$ represents a normalized value of $S_L$, and $$S_E=\sqrt{I_E^2+Q_E^2}, S_P=\sqrt{I_P^2+Q_P^2}, S_L=\sqrt{I_L^2+Q_L^2}.$$

Compared to the prior arts, the technical solutions adopted in the present disclosure have the following beneficial effects.

1. A multipath suppression mechanism is adopted in the present disclosure, and the conclusion from the autocorrelation function of the ranging codes can better suppress the multipath effect and realize a shorter adjustment time and a smaller steady-state error for a multipath suppression loop.

2. Compared with the traditional narrow-distance correlation method, the multipath suppression loop designed in the present disclosure spares one branch of an advanced branch or a lagging branch, thereby reducing the computation loads by nearly ⅓.

BRIEF DESCRIPTION OF THE DRAWINGS

FIG. 1 illustrates a schematic diagram of a multipath suppression loop of the present disclosure.

DETAILED DESCRIPTION OF THE EMBODIMENTS

The embodiments of the present disclosure will be described below in detail, examples of which are illustrated in the drawings. The embodiments described below in combination with the drawings are exemplary and are merely to explain the present disclosure rather than being interpreted as limitation on the present disclosure.

A multipath suppression loop method based on a steepest descent method, as illustrated in FIG. 1, including four parts in total. Firstly, carriers are mixed; secondly, the ranging codes are taken for correlating operations; then, a process of low-pass filtering is conducted; and eventually, the tracking loop of the ranging codes is controlled by the code loop control algorithm designed in the present disclosure. The process of the present disclosure is described in detail below.

Step 1: Carrier Mixing

According to carrier Doppler-frequency-shift information fed back by a phase-locked loop, a pair of orthogonal signals are generated by a local carrier Numerical Controlled Oscillator (NCO), and are mixed with an intermediate-frequency signal x(n) input into a tracking loop respectively, to obtain orthogonal sequences i(n) and q(n) after carrier extracting.

Assumed is that the signal structure of the intermediate-frequency signal input to the tracking loop is shown as the following equation:

$$x(n)=AC(n)D(n)\cos(w_I n+\theta_0).$$

In the above equation, A represents an amplitude of the intermediate-frequency signal x(n) input into the tracking loop, C(n) represents a ranging-code sequence modulated in the intermediate-frequency signal x(n) input into the tracking loop, D(n) represents a data-code sequence modulated in the intermediate-frequency signal x(n) input into the tracking loop, $w_I$ represents an intermediate-frequency angular velocity of the intermediate-frequency signal x(n) input into the tracking loop, $\theta_0$ represents an initial phase of a carrier of the intermediate-frequency signal x(n) input into the tracking loop.

A pair of orthogonal signals generated by the local carrier NCO are mixed with the x(n) respectively, and a high-frequency component is removed to obtain a pair of orthogonal signals i(n) and q(n). The process is shown as the following equation:

$$\begin{aligned}i(n) &= (x(n))(2\cos(w'_I n+\theta_1)) = \\ &\quad AC(n)D(n)\cos(\theta_0-\theta_1+(w_I-w'_I)n)+AC(n)D(n)\cos((w_I+w'_I)n+\theta_0+\theta_1)\\ q(n) &= (x(n))(2\sin(w'_I n+\theta_1)) = \\ &\quad -AC(n)D(n)\sin(\theta_0-\theta_1+(w_I-w'_I)n)+AC(n)D(n)\sin((w_I+w'_I)n+\theta_0+\theta_1)\end{aligned}$$

In the above equation, $w'_I$ is an angular velocity of a locally-generated signal, $\theta_1$ represents an initial phase of a locally-generated carrier signal, where $w_I-w'_I\approx 0$ due to the phase-locked-loop feedback. Therefore, the pair of orthogonal signals i(n) and q(n) obtained after frequency mixing can be simplified as:

$$\begin{aligned}i(n) &= (x(n))(2\cos(w'_I n+\theta_1))\\ &= AC(n)D(n)\cos(\theta_0-\theta_1)+AC(n)D(n)\cos(2w_I n+\theta_0+\theta_1)\\ q(n) &= (x(n))(2\sin(w'_I n+\theta_1))\\ &= -AC(n)D(n)\sin(\theta_0-\theta_1)+AC(n)D(n)\sin(2w_I n+\theta_0+\theta_1)\end{aligned}.$$

Step 2: Correlating Operations of the Ranging Codes

According to the fact that the control process of the code loop controller designed in the present disclosure adopts a left partial derivative or a right partial derivative of the cost function PF($\hat{\tau}$), two strategies can be adopted by the process, and only one of the two strategies is required to be selected. Two code sequences are generated by a local ranging-code generator. When the left partial derivative of the function PF($\hat{\tau}$) is adopted, the two code sequences are a local punctual-code sequence C'(n) and a local late code sequence C'(n−d) respectively; and when the right partial derivative of the function PF($\hat{\tau}$) is adopted, the two code sequences are the local punctual-code sequence C'(n) and a local early codesequence C'(n+d) respectively.

When the right partial derivative is adopted, the process of the code correlating operation is as follows.

The local punctual-code sequence C'(n) with 1 ms duration and the local early codesequence C'(n+d) with 1 ms duration are taken respectively with a pair of orthogonal signals i(n) and q(n) after extracting off the carrier with 1 ms duration for a correlating operation. The operation process is as follows:

$$\begin{aligned}i_E(n) &= i(n)C'(n+d) = AR(\hat{\tau}+d)D(n)\cos(\theta_0-\theta_1)+AR(\hat{\tau}+d)D(n)\cos(2w_I n+\theta_0+\theta_1)\\ i_P(n) &= i(n)C'(n) = AR(\hat{\tau})D(n)\cos(\theta_0-\theta_1)+AR(\hat{\tau})D(n)\cos(2w_I n+\theta_0+\theta_1)\\ q_E(n) &= q(n)C'(n+d) = -AR(\hat{\tau}+d)D(n)\sin(\theta_0-\theta_1)+AR(\hat{\tau}+d)D(n)\sin(2w_I n+\theta_0+\theta_1)\\ q_P(n) &= q(n)C'(n) = -AR(\hat{\tau})D(n)\sin(\theta_0-\theta_1)+AR(\hat{\tau})D(n)\sin(2w_I n+\theta_0+\theta_1)\end{aligned}.$$

In the above equations, d represents an interval of the ranging codes, $i_E(n)$ is an I branch sequence with 1 ms duration correlated with the local early code, $i_P(n)$ is an I branch sequence with 1 ms duration correlated with the local punctual code, $q_E(n)$ is a Q branch sequence with 1 ms duration correlated with the local early code, and $q_P(n)$ is a Q branch sequence with 1 ms duration correlated with the local punctual code.

When the left partial derivative is adopted, the process of the code correlating operation is as follows.

The local punctual-code sequence C'(n) with 1 ms duration and the local late code sequence C'(n–d) with 1 ms duration are taken respectively with a pair of orthogonal signals i(n) and q(n) after extracting off the carrier with 1 ms duration for a correlating operation. The operation process is as follows:

$$i_L(n) = i(n)C'(n-d) = AR(\hat{\tau} - d)D(n)\cos(\theta_0 - \theta_1) + AR(\hat{\tau} - d)D(n)\cos(2w_I n + \theta_0 + \theta_1)$$
$$i_P(n) = i(n)C'(n) = AR(\hat{\tau})D(n)\cos(\theta_0 - \theta_1) + AR(\hat{\tau})D(n)\cos(2w_I n + \theta_0 + \theta_1)$$
$$q_L(n) = q(n)C'(n-d) = -AR(\hat{\tau} - d)D(n)\sin(\theta_0 - \theta_1) + AR(\hat{\tau} - d)D(n)\sin(2w_I n + \theta_0 + \theta_1)$$
$$q_P(n) = q(n)C'(n) = -AR(\hat{\tau})D(n)\sin(\theta_0 - \theta_1) + AR(\hat{\tau})D(n)\sin(2w_I n + \theta_0 + \theta_1)$$

In the above equations, d represents the interval of the ranging codes, $i_L(n)$ is an I branch sequence with 1 ms duration correlated with the local late code, $i_P(n)$ is an I branch sequence with 1 ms duration correlated with the local punctual code, $q_L(n)$ is a Q branch sequence with 1 ms duration correlated with the local late code, and $q_P(n)$ is a Q branch sequence with 1 ms duration correlated with the local punctual code.

Step 3: Low-Pass Filtering

The sequences $i_E(n)$, $i_P(n)$, $q_E(n)$ and $q_P(n)$ with 1 ms duration obtained in Step 2 are taken for a mean-value operation respectively to obtain corresponding four values of $I_E$, $I_P$, $Q_E$ and $Q_P$. Alternatively, the sequences $i_L(n)$, $i_P(n)$, $q_L(n)$ and $q_P(n)$ with 1 ms duration obtained in Step 2 are taken for a mean-value operation respectively to obtain corresponding four values of $I_L$, $I_P$, $Q_L$ and $Q_P$.

When the right partial derivative is adopted, since the data code D(n) is a constant in the integration period, the signals passing through the low-pass filtering are shown as the following equations:

$$I_E = \frac{1}{Tf_s}\sum_{n=1}^{Tf_s} i_E(n) \approx AR(\hat{\tau} + d)\cos(\theta_0 - \theta_1)$$
$$I_P = \frac{1}{Tf_s}\sum_{n=1}^{Tf_s} i_P(n) \approx AR(\hat{\tau})\cos(\theta_0 - \theta_1)$$
$$Q_E = \frac{1}{Tf_s}\sum_{n=1}^{Tf_s} q_E(n) \approx -AR(\hat{\tau} + d)\sin(\theta_0 - \theta_1)$$
$$Q_P = \frac{1}{Tf_s}\sum_{n=1}^{Tf_s} q_P(n) \approx -AR(\hat{\tau})\sin(\theta_0 - \theta_1)$$

In the above equations, T represents an integration time which is integer multiples of a period of a ranging code generally, and is set as 1 ms in the present disclosure, $f_s$ represents a sampling rate, R(·) represents an autocorrelation function of the ranging codes, $\hat{\tau}$ represents a distance between the local punctual code and a signal ranging code, $I_E$ is a mean value of the sequence $i_E(n)$, which is a number; $I_P$ is a mean value of the sequence $i_P(n)$, which is a number; $Q_E$ is a mean value of the sequence $q_E(n)$, which is a number; and $Q_P$ is a mean value of the sequence $q_P(n)$, which is a number.

When the left partial derivative is adopted, since the data code D(n) is a constant in the integration period, the signals passing through the low-pass filtering are shown as the following equations:

$$I_L = \frac{1}{Tf_s}\sum_{n=1}^{Tf_s} i_L(n) \approx AR(\hat{\tau} - d)\cos(\theta_0 - \theta_1)$$
$$I_P = \frac{1}{Tf_s}\sum_{n=1}^{Tf_s} i_P(n) \approx AR(\hat{\tau})\cos(\theta_0 - \theta_1)$$
$$Q_L = \frac{1}{Tf_s}\sum_{n=1}^{Tf_s} q_L(n) \approx -AR(\hat{\tau} - d)\sin(\theta_0 - \theta_1)$$
$$Q_P = \frac{1}{Tf_s}\sum_{n=1}^{Tf_s} q_P(n) \approx -AR(\hat{\tau})\sin(\theta_0 - \theta_1)$$

In the above equations, T represents an integration time which is integer multiples of a period of a ranging code generally, and is set as 1 ms in the present disclosure, $f_s$ represents a sampling rate, R(·) represents an autocorrelation function of the ranging codes, $\hat{\tau}$ represents a distance between the local punctual code and a signal ranging code, $I_L$ is a mean value of the sequence $i_L(n)$, which is a number; $I_P$ is a mean value of the sequence $i_P(n)$, which is a number; $Q_L$ is a mean value of the sequence $q_L(n)$, which is a number; and $Q_P$ is a mean value of the sequence $q_P(n)$, which is a number.

Step 4: Code Loop Control

According to the $I_E$, $I_P$, $Q_E$ and $Q_P$ obtained in Step 3, a ranging code offset is calculated by the code loop controller based on the steepest descent method, and the ranging code offset is fed back to the local ranging-code generator. Alternatively, according to the $I_L$, $I_P$, $Q_L$ and $Q_P$ obtained in Step 3, a ranging code offset is calculated by the code loop controller based on the steepest descent method, and the ranging code offset is fed back to the local ranging-code generator.

The following describes the principle of the code loop controller based on the steepest descent method.

Firstly, according to an autocorrelation function of the ranging codes, a cost function is defined as follows: $PF(R) = (1-R)^2$.

The $I_E$, $I_P$, $Q_E$ and $Q_P$ obtained in Step 3 involve carrier information. In order to weaken the influence of the carrier on the code loop control process, the values are required to be processed under the following equations:

$$S_E\sqrt{I_E{}^2+Q_E{}^2}=AR(\hat{\tau}+d)$$

$$S_P=\sqrt{I_P{}^2+Q_P{}^2}=AR(\hat{\tau})$$

In the above equations, $S_E$ represents a correlation value of the early code, which is a numerical value; and $S_P$ represents a correlation value of the punctual code, which is a numerical value.

Since the amplitude of the signal x(n) is a constant in a short time, and the maximum value of the autocorrelation function RO of the ranging codes is 1, the influence of the amplitude A on the correlation peaks can be eliminated by signal normalization. The normalization process is shown in the following equations:

$$\overline{S}_E=S_E/S_{max}\approx R(\hat{\tau}+d)$$

$$\overline{S}_P=S_P/S_{max}\approx R(\hat{\tau})$$

In the above equations, $S_{max}$ represents a larger value between the maximum value of $S_E$ and the maximum value of $S_P$ in the tracking process, and $\overline{S}_E$ represents a normalized early-code correlation value, and $\overline{S}_P$ represents a normalized punctual-code correlation value.

Through the above analysis, the values of the cost function for $\overline{S}_E$ and $\overline{S}_P$ can be obtained, as shown in the following equations:

$$PF(\overline{S}_E)=(1-\overline{S}_E)^2$$

$$PF(\overline{S}_P)=(1-\overline{S}_P)^2$$

According to the principle of the steepest descent method, the controlling equation of the distance between the locally-generated punctual code and a signal ranging code can be obtained by using the right partial derivative of the functions, as shown in the following equation:

$$\hat{\tau}_{k+1} = \hat{\tau}_k - \mu \frac{PF(\overline{S}_E|_k) - PF(\overline{S}_P|_k)}{d}.$$

In the above equation, $\mu$ is a positive scalar named step length, $\hat{\tau}_k$ represents a distance between the local punctual code and the signal ranging code in the current second, $\hat{\tau}_{k+1}$ represents a distance between the local punctual code and the signal ranging code in the next second, $PF(\overline{S}_E|_K)$ represents a value of the cost function for a normalized early-code correlation value in the current second, and $PF(\overline{S}_P|_K)$ represents a value of the cost function for a normalized punctual-code correlation value in the current second.

Alternatively, the $I_L$, $I_P$, $Q_L$ and $Q_P$ obtained in Step 3 involve carrier information. In order to weaken the influence of the carrier on the code loop control process, the values are required to be processed under the following equations:

$$S_L=\sqrt{I_L{}^2+Q_L{}^2}=AR(\hat{\tau}-d)$$

$$S_P=\sqrt{I_P{}^2+Q_P{}^2}=AR(\hat{\tau})$$

In the above equations, $S_L$ represents a correlation value of the late code, which is a numerical value; and $S_P$ represents a correlation value of the punctual code, which is a numerical value.

Since the amplitude of the signal x(n) is a constant in a short time, and the maximum value of the autocorrelation function RO of the ranging codes is 1, the influence of the amplitude A on the correlation peak can be eliminated by the signal normalization. The normalization process is shown as the following equations:

$$\overline{S}_L=S_L/S_{max}\approx R(\hat{\tau}-d)$$

$$\overline{S}_P=S_P/S_{max}\approx R(\hat{\tau})$$

In the above equations, $S_{max}$ represents a larger value between the maximum value of $S_L$ and the maximum value of $S_P$ in the tracking process, and $\overline{S}_L$ represents a normalized late code correlation value, and $\overline{S}_P$ represents a normalized punctual-code correlation value.

Through the above analysis, the value of the cost function for $\overline{S}_L$ and $\overline{S}_P$ can be obtained, as shown in the following equations:

$$PF(\overline{S}_L)=(1-\overline{S}_L)^2$$

$$PF(\overline{S}_P)=(1-\overline{S}_P)^2$$

According to the principle of the steepest descent method, the controlling equation of the distance between the locally generated punctual code and a signal ranging code can be obtained by using the right partial derivative of the function, as shown in the following equation:

$$\hat{\tau}_{k+1} = \hat{\tau}_k - \mu \frac{PF(\overline{S}_P|_k) - PF(\overline{S}_L|_k)}{d}.$$

In the above equation, $\rho$ is a positive scalar named step length, $\hat{\tau}_k$ represents a distance between the local punctual code and the signal ranging code in the current second, $\hat{\tau}_{k+1}$ represents a distance between the local punctual code and the signal ranging code in the next second, $PF(\overline{S}_L|_K)$ represents a value of the cost function for a normalized late code correlation value in the current second, and $PF(S_P|_K)$ represents a value of the cost function for a normalized punctual-code correlation value in the current second.

The above embodiments are only to illustrate the technical spirits of the present disclosure and cannot be used to limit the protection scope of the present disclosure. Any changes made on the basis of the technical scheme in accordance with the technical spirits of the present disclosure shall fall within the protection scope of the present disclosure.

What is claimed is:

1. A multipath suppression method based on a steepest descent method, comprising following steps:

Step 1, generating, according to carrier Doppler-frequency-shift information fed back by a phase-locked loop, a pair of orthogonal signals by a local carrier Numerical Controlled Oscillator, and mixing the pair of orthogonal signals with an intermediate-frequency signal x(n) input into a tracking loop of ranging codes respectively, to obtain a pair of orthogonal signals i(n) and q(n) after carrier extracting;

Step 2, designing, a quadratic cost function $PF(R)=(1-R)^2$, where R represents an autocorrelation function of the ranging codes, according to the quadratic cost function and a principle of the steepest descent method, when a right partial derivative of the cost function is adopted in a control process of a code loop controller, a local punctual-code sequence C'(n) and a local early codesequence C'(n+d) are generated by a local ranging-code generator, and the orthogonal signals i(n) and q(n) are taken respectively with the local punctual-code sequence C'(n) for a correlating operation to obtain $i_P(n)$ and $q_P(n)$, and the orthogonal signals i(n) and q(n)

are taken respectively with the local early codesequence C'(n+d) for a correlating operation to obtain $i_E(n)$ and $q_E(n)$; or when a left partial derivative of the cost function is adopted in a control process of a code loop controller, a local punctual-code sequence C'(n) and a local late code sequence C'(n-d) are generated by a local ranging-code generator, and the orthogonal signals i(n) and q(n) are taken respectively with the local punctual-code sequence C'(n) for a correlating operation to obtain $i_P(n)$ and $q_P(n)$, and the orthogonal signals i(n) and q(n) are taken respectively with the late code sequence C'(n−d) of a correlating operation to obtain $i_L(n)$ and $q_L(n)$; where $i_P(n)$ is an I branch sequence correlated with a local punctual code, $q_P(n)$ is a Q branch sequence correlated with the local punctual code, $i_L(n)$ is an I branch sequence correlated with a local late code, $q_L(n)$ is a Q branch sequence correlated with the local late code, $i_E(n)$ is an I branch sequence correlated with a local early code, and $q_E(n)$ is a Q branch sequence correlated with the local early code;

Step 3, taking the sequences $i_E(n)$, $i_P(n)$, $q_E(n)$ and $q_P(n)$ obtained in Step 2 for a mean-value operation respectively to obtain corresponding $I_E$, $I_P$, $Q_E$ and $Q_P$, where $I_E$ is a mean value of the sequence $i_E(n)$; $I_P$ is a mean value of the sequence $i_P(n)$, $Q_E$ is a mean value of the sequence $q_E(n)$; and $Q_P$ is a mean value of the sequence $q_P(n)$; or taking the sequences $i_L(n)$, $i_P(n)$, $q_L(n)$ and $q_P(n)$ obtained in Step 2 for a mean-value operation respectively to obtain corresponding $I_L$, $I_P$, $Q_L$ and $Q_P$, where $I_L$ is a mean value of the sequence $i_L(n)$; $Q_L$ is a mean value of the sequence $q_L(n)$; and Step 4, calculating, according to the $I_E$, $I_P$, $Q_E$ and $Q_P$ obtained in Step 3, a ranging code offset by the code loop controller based on the steepest descent method, and feeding the ranging code offset back to the local ranging-code generator; or $$i_L(n) = i(n)C'(n-d) = AR(\hat{\tau}-d)D(n)\cos(\theta_0-\theta_1) + AR(\hat{\tau}-d)D(n)\cos(2w_I n+\theta_0+\theta_1)$$
$$i_P(n) = i(n)C'(n) = AR(\hat{\tau})D(n)\cos(\theta_0-\theta_1) + AR(\hat{\tau})D(n)\cos(2w_I n+\theta_0+\theta_1)$$
$$q_L(n) = q(n)C'(n-d) = -AR(\hat{\tau}-d)D(n)\sin(\theta_0-\theta_1) + AR(\hat{\tau}-d)D(n)\sin(2w_I n+\theta_0+\theta_1),$$
$$q_P(n) = q(n)C'(n) = -AR(\hat{\tau})D(n)\sin(\theta_0-\theta_1) + AR(\hat{\tau})D(n)\sin(2w_I n+\theta_0+\theta_1)$$

calculating, according to the $I_L$, $I_P$, $Q_L$ and $Q_P$ obtained in Step 3, a ranging code offset through the code loop controller based on the steepest descent method, and feeding the ranging code offset back to the local ranging-code generator.

2. The multipath suppression method based on the steepest descent method according to claim 1, wherein in the generating, the pair of orthogonal signals by the local carrier Numerical Controlled Oscillator, and mixing the pair of orthogonal signals with the intermediate-frequency signal x(n) input into the tracking loop of the ranging codes respectively, to obtain the pair of orthogonal signals i(n) and q(n) after the carrier extracting, equations are as follows:

$$i(n) = (x(n))(2\cos(w'_I n+\theta_1)) = AC(n)D(n)\cos(\theta_0-\theta_1) + AC(n)D(n)\cos(2w_I n+\theta_0+\theta_1)$$
$$q(n) = (x(n))(2\sin(w'_I n+\theta_1)) = -AC(n)D(n)\sin(\theta_0-\theta_1) + AC(n)D(n)\sin(2w_I n+\theta_0+\theta_1),$$

where A represents an amplitude of the intermediate-frequency signal x(n) input into the tracking loop; C(n) represents a ranging-code sequence modulated in the intermediate-frequency signal x(n) input into the tracking loop; D(n) represents a data-code sequence modulated in the intermediate-frequency signal x(n) input into the tracking loop; $w'_I$ is an angular velocity of a locally-generated signal; $w_I$ represents an intermediate-frequency angular velocity of the intermediate-frequency signal x(n) input into the tracking loop, where $w_I - w'_I \approx 0$; $\theta_0$ represents an initial phase of a carrier of the intermediate-frequency signal x(n) input into the tracking loop; $\theta_1$ represents an initial phase of a locally-generated carrier signal; n represents a time point, and an interval between the time point n and a time point n+1 is one sampling period.

3. The multipath suppression method based on the steepest descent method according to claim 1, wherein, in Step 2, in the taking the orthogonal signals i(n) and q(n) respectively with the local punctual-code sequence C'(n) for the correlating operation to obtain $i_P(n)$ and $q_P(n)$, and taking the orthogonal signals i(n) and q(n) respectively with the local early codesequence C'(n+d) for the correlating operation to obtain $i_E(n)$ and $q_E(n)$, equations are as follows:

$$i_E(n) = i(n)C'(n+d) = AR(\hat{\tau}+d)D(n)\cos(\theta_0-\theta_1) + AR(\hat{\tau}+d)D(n)\cos(2w_I n+\theta_0+\theta_1)$$
$$i_P(n) = i(n)C'(n) = AR(\hat{\tau})D(n)\cos(\theta_0-\theta_1) + AR(\hat{\tau})D(n)\cos(2w_I n+\theta_0+\theta_1)$$
$$q_E(n) = q(n)C'(n+d) = -AR(\hat{\tau}+d)D(n)\sin(\theta_0-\theta_1) + AR(\hat{\tau}+d)D(n)\sin(2w_I n+\theta_0+\theta_1),$$
$$q_P(n) = q(n)C'(n) = -AR(\hat{\tau})D(n)\sin(\theta_0-\theta_1) + AR(\hat{\tau})D(n)\sin(2w_I n+\theta_0+\theta_1)$$

in the taking the orthogonal signals i(n) and q(n) respectively with the local punctual-code sequence C'(n) for the correlating operation to obtain $i_P(n)$ and $q_P(n)$, and taking the orthogonal signals i(n) and q(n) respectively with the late code sequence C'(n-d) for the correlating operation to obtain $i_L(n)$ and $q_L(n)$, equations are as follows:

where A represents an amplitude of the intermediate-frequency signal x(n) input into the tracking loop, D(n) represents a data-code sequence modulated in the intermediate-frequency signal x(n) input into the tracking loop, $w_I$ represents an intermediate-frequency angular velocity of the intermediate-frequency signal x(n) input into the tracking loop, $\theta_0$ represents an initial phase of a carrier of the intermediate-frequency signal x(n) input into the tracking loop; $\theta_1$ represents an initial phase of a locally-generated carrier signal; $\hat{\tau}$ represents a time point, R(·) represents an autocorrelation function of the ranging codes, $\hat{\tau}$ represents a distance between the local punctual code and a signal ranging code, and d represents an interval of the ranging codes.

4. The multipath suppression method based on the steepest descent method according to claim 1, wherein equations of the $I_E$, $I_P$, $Q_E$ and $Q_P$ in Step 3 are as follows:

$$I_E = \frac{1}{Tf_s}\sum_{n=1}^{Tf_s} i_E(n) \approx AR(\hat{\tau}+d)\cos(\theta_0-\theta_1)$$

$$I_P = \frac{1}{Tf_s}\sum_{n=1}^{Tf_s} i_P(n) \approx AR(\hat{\tau})\cos(\theta_0-\theta_1)$$

$$Q_E = \frac{1}{Tf_s}\sum_{n=1}^{Tf_s} q_E(n) \approx -AR(\hat{\tau}+d)\sin(\theta_0-\theta_1)$$

$$Q_P = \frac{1}{Tf_s}\sum_{n=1}^{Tf_s} q_P(n) \approx -AR(\hat{\tau})\sin(\theta_0-\theta_1)$$

, and equations of the $I_L$, $I_P$, $Q_L$ and $Q_P$ are as follows:

$$I_L = \frac{1}{Tf_s}\sum_{n=1}^{Tf_s} i_L(n) \approx AR(\hat{\tau}-d)\cos(\theta_0-\theta_1)$$

$$I_P = \frac{1}{Tf_s}\sum_{n=1}^{Tf_s} i_P(n) \approx AR(\hat{\tau})\cos(\theta_0-\theta_1)$$

$$Q_L = \frac{1}{Tf_s}\sum_{n=1}^{Tf_s} q_L(n) \approx -AR(\hat{\tau}-d)\sin(\theta_0-\theta_1)$$

$$Q_P = \frac{1}{Tf_s}\sum_{n=1}^{Tf_s} q_P(n) \approx -AR(\hat{\tau})\sin(\theta_0-\theta_1)$$

, where T represents an integration time, $f_s$ represents a sampling rate, n represents a time point, A represents an amplitude of the intermediate-frequency signal x(n) input into the tracking loop, R(·) represents an autocorrelation function of the ranging codes, $\hat{\tau}$ represents a distance between the local punctual code and a signal ranging code, d represents an interval of the ranging codes, $\theta_0$ represents an initial phase of a carrier of the intermediate-frequency signal x(n) input into the tracking loop; and $\theta_1$ represents an initial phase of a locally-generated carrier signal.

5. The multipath suppression method based on the steepest descent method according to claim 1, wherein a equation of the ranging code offset in Step 4 is as follows:

$$\hat{\tau}_{k+1} = \hat{\tau}_k - \mu\frac{PF(\overline{S}_E|_k)-PF(\overline{S}_P|_k)}{d},$$

or the equation is as follows:

$$\hat{\tau}_{k+1} = \hat{\tau}_k - \mu\frac{PF(\overline{S}_P|_k)-PF(\overline{S}_L|_k)}{d},$$

where $\hat{\tau}_{k+1}$, and $\hat{\tau}_k$ respectively represent $\hat{\tau}$ at a time point k+1 and a time point k, $\hat{\tau}$ represents a distance between the local punctual code and a signal ranging code, an interval between the time point k+1 and the time point k is an integration time, $\mu$ is a positive scalar named step length, PF(·) represents a cost function, $\overline{S}_E|_K$, $\overline{S}_P|_K$ and $\overline{S}_L|_K$ respectively represent values of $\overline{S}_E$, $\overline{S}_P$, and $\overline{S}_L$ at the time point k, $\overline{S}_E$ represents a normalized value of $S_E$, $\overline{S}_P$ represents a normalized value of $S_P$, $\overline{S}_L$ represents a normalized value of $S_L$, and $$S_E=\sqrt{I_E^2+Q_E^2}, S_P=\sqrt{I_P^2+Q_P^2}, S_L=\sqrt{I_L^2+Q_L^2}.$$

* * * * *